US012640436B2

(12) United States Patent
Nagata

(10) Patent No.: US 12,640,436 B2
(45) Date of Patent: May 26, 2026

(54) METHOD FOR MANUFACTURING BATTERY, BATTERY, AND BATTERY INTERMEDIATE

(71) Applicant: TOYOTA JIDOSHA KABUSHIKI KAISHA, Toyota (JP)

(72) Inventor: Yuka Nagata, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 531 days.

(21) Appl. No.: 18/121,138

(22) Filed: Mar. 14, 2023

(65) Prior Publication Data

US 2023/0299418 A1     Sep. 21, 2023

(30) Foreign Application Priority Data

Mar. 18, 2022     (JP) ................................. 2022-043977

(51) Int. Cl.
H01M 50/414     (2021.01)
H01M 50/552     (2021.01)
H01M 50/566     (2021.01)

(52) U.S. Cl.
CPC ....... H01M 50/414 (2021.01); H01M 50/552 (2021.01); H01M 50/566 (2021.01)

(58) Field of Classification Search
CPC . H01M 50/414; H01M 50/552; H01M 50/566
See application file for complete search history.

(56) References Cited

U.S. PATENT DOCUMENTS

| | | | |
|---|---|---|---|
| 2009/0263712 A1 | 10/2009 | Mizuta et al. | |
| 2014/0370371 A1* | 12/2014 | Ozawa ................ | H01M 50/533 |
| | | | 429/179 |

FOREIGN PATENT DOCUMENTS

| | | | | |
|---|---|---|---|---|
| CN | 104145350 B | 7/2017 | | |
| CN | 113632312 A | 11/2021 | | |
| JP | 2006-164784 A | 6/2006 | | |
| JP | 2021-150231 A | 9/2021 | | |
| KR | 101403692 B1 * | 6/2014 | ......... | H01M 10/045 |
| KR | 10-2017-0077056 A | 7/2017 | | |
| KR | 101958523 B1 * | 3/2019 | ............. | H01M 2/26 |
| WO | 2007/105541 A1 | 9/2007 | | |

OTHER PUBLICATIONS

KR 101403692 English Translation (Year: 2014).*
KR 101958523 English Translation (Year: 2019).*

* cited by examiner

*Primary Examiner* — Jimmy Vo
(74) *Attorney, Agent, or Firm* — Sughrue Mion, PLLC

(57)     ABSTRACT

A method for manufacturing a battery includes: a placing step of placing a resin layer along at least one surface in a thickness direction of a current collector terminal; an enclosing step of enclosing the power generation element in an outer body; and a sealing step of sealing the power generation element inside the outer body. The current collector terminal includes a flat terminal portion and a tilted terminal portion. The resin layer includes a flat resin layer portion and a tilted resin layer portion. In the placing step, the resin layer is placed on the current collector terminal such that $\theta1>\theta2$ is satisfied, where $\theta1$ is an angle between the flat terminal portion and a straight line extended from the tilted terminal portion, and $\theta2$ is an angle between the flat resin layer portion and a straight line extended from the tilted resin layer portion.

9 Claims, 8 Drawing Sheets

100

METHOD FOR MANUFACTURING BATTERY, BATTERY, AND BATTERY INTERMEDIATE

CROSS-REFERENCE TO RELATED APPLICATION

This application claims priority to Japanese Patent Application No. 2022-043977 filed on Mar. 18, 2022, incorporated herein by reference in its entirety.

BACKGROUND

1. Technical Field

The present application relates to methods for manufacturing a battery, batteries, and battery intermediates.

2. Description of Related Art

Laminated batteries in which a power generation element is sealed with a laminated film are known in the art. A laminated battery has a structure in which current collector terminals connected to a power generation element extend to the outside, and the current collector terminals are sandwiched between the laminated films and heat welded.

In recent years, consideration has been given to increasing the thickness of current collector terminals in order to accommodate higher battery performance. However, increasing the thickness of the current collector terminals is disadvantageous as a gap may form between the laminated film and the current collector terminal, particularly the end portion in the lateral direction of the current collector terminal. Such a gap affects airtightness of the laminated battery. Namely, moisture enters the laminated battery from the outside, resulting in deterioration of the power generation element. Moreover, in the case of a liquid-state battery, the electrolytic solution inside the battery leaks to the outside through the gap. It is therefore necessary to reduce such poor heat welding.

In order to solve such problems, Japanese Unexamined Patent Application Publication No. 2006-164784 (JP 2006-164784 A) discloses a laminated battery having current collector terminals that are gradually thinned as they get closer to the outside in the lateral direction. In such a laminated battery, a gap is less likely to form between the end portion of the current collector terminal and the laminated film.

SUMMARY

In the laminated battery described in JP 2006-164784 A, a gap is certainly less likely to form between the end portion of the current collector terminal and the laminated film. However, a gap may form between the end portion of the current collector terminal and the laminated film during heat welding due to a manufacturing tolerance. Therefore, the technique disclosed in JP 2006-164784 A has room for improvement.

The present application provides a method for manufacturing a battery and a battery that can reduce poor heat welding.

A method for manufacturing a battery according to a first aspect of the present disclosure is a method for manufacturing a battery including a power generation element, an outer body housing the power generation element, and a current collector terminal electrically connected to the power generation element and placed so as to extend to outside from the outer body. The method includes: a placing step of placing a resin layer along at least one surface in a thickness direction of the current collector terminal connected to the power generation element, the at least one surface being a surface of the current collector terminal; an enclosing step of enclosing the power generation element in the outer body; and a sealing step of sealing the power generation element inside the outer body by heat welding. The resin layer and the outer body are heat welded in the sealing step. The current collector terminal includes a flat terminal portion with a constant thickness, and a tilted terminal portion connected to the flat terminal portion and thinned toward outside in a lateral direction of the current collector terminal. The tilted terminal portion is provided in at least one end portion of the current collector terminal in the lateral direction of the current collector terminal. The resin layer includes a flat resin layer portion placed along a surface of the flat terminal portion, and a tilted resin layer portion connected to the flat resin layer portion and placed along a surface of the tilted terminal portion. In the placing step, the resin layer is placed on the current collector terminal such that $\theta1$ and $\theta2$ satisfy $\theta1 > \theta2$, in the placing step, $\theta1$ is an angle between the flat terminal portion and a straight line extended from the tilted terminal portion, and $\theta2$ is an angle between the flat resin layer portion and a straight line extended from the tilted resin layer portion.

In the method for manufacturing a battery according to the first aspect of the present disclosure, in the sealing step, the power generation element may be sealed inside the outer body such that $\theta3$ and $\theta4$ satisfy $\theta3 > \theta4$, in the sealing step, $\theta3$ may be an angle between the flat terminal portion and a straight line extended from the tilted terminal portion, and $\theta4$ may be an angle between the flat resin layer portion and a straight line extended from the tilted resin layer portion.

In the method for manufacturing a battery according to the first aspect of the present disclosure, in the sealing step, the resin layer and the outer body may be heat welded by a heat bar. The outer body may include a flat outer body portion and a tilted outer body portion, the flat outer body portion being a portion corresponding to the flat resin layer portion, and the tilted outer body portion being a portion corresponding to the tilted resin layer portion. The heat bar may include a flat heat bar portion and a tilted heat bar portion, the flat heat bar portion being a portion corresponding to the flat outer body portion, and the tilted heat bar portion being a portion corresponding to the tilted outer body portion. A relationship of $\theta1 \geq \theta y > \theta2$ may be satisfied, where $\theta y$ may be an angle between an inner surface of the flat heat bar portion and a straight line extended from an inner surface of the tilted heat bar portion.

In the method for manufacturing a battery according to the first aspect of the present disclosure, the resin layer may include, in a longitudinal direction of the resin layer, a first region to be welded to the outer body and a second region not to be welded to the outer body. The first region of the resin layer may include a flat first region portion placed along the surface of the flat terminal portion, and a tilted first region portion connected to the flat first region portion and placed along the surface of the tilted terminal portion. The second region of the resin layer may include a flat second region portion placed along the surface of the flat terminal portion, and a tilted second region portion connected to the flat second region portion and placed along the surface of the tilted terminal portion. In the sealing step, the power generation element may be sealed inside the outer body such that $\theta5$ and $\theta6$ satisfy $\theta5 > \theta6$, in the sealing step, $\theta5$ may be an angle between the flat first region portion and a straight line extended from the tilted first region portion, and θ6 may be an angle between the flat second region portion and a straight line extended from the tilted second region portion.

In the method for manufacturing a battery according to the first aspect of the present disclosure, θ2 may be an angle between an outer surface of the flat resin layer portion and a straight line extended from an outer surface of the tilted resin layer portion.

In the method for manufacturing a battery according to the first aspect of the present disclosure, a length of the flat terminal portion in the lateral direction of the flat terminal portion may be 20% or more and 90% or less of a length of the current collector terminal in the lateral direction of the current collector terminal, and a length of the tilted terminal portion in the lateral direction of the tilted terminal portion may be 10% or more and 80% or less of the length of the current collector terminal in the lateral direction of the current collector terminal.

A battery according to a second aspect of the present disclosure includes: a power generation element; an outer body housing the power generation element; a current collector terminal electrically connected to the power generation element and located so as to extend to outside from the outer body; and a resin layer located along at least one surface in a thickness direction of the current collector terminal and located between the current collector terminal and the outer body, the at least one surface being a surface of the current collector terminal. The resin layer and the outer body are heat welded together. The current collector terminal includes a flat terminal portion with a constant thickness, and a tilted terminal portion connected to the flat terminal portion and thinned toward outside in a lateral direction of the current collector terminal. The tilted terminal portion is provided in at least one end portion of the current collector terminal in the lateral direction of the current collector terminal. The resin layer includes a flat resin layer portion located along a surface of the flat terminal portion, and a tilted resin layer portion connected to the flat resin layer portion and located along a surface of the tilted terminal portion. θ3 and θ4 satisfy θ3>θ4, where θ3 is an angle between the flat terminal portion and a straight line extended from the tilted terminal portion, and θ4 is an angle between the flat resin layer portion and a straight line extended from the tilted resin layer portion.

In the battery according to the second aspect of the present disclosure, the resin layer may include, in a longitudinal direction of the resin layer, a first region welded to the outer body and a second region not welded to the outer body. The first region of the resin layer may include a flat first region portion located along a surface of the flat terminal portion, and a tilted first region portion connected to the flat first region portion and located along a surface of the tilted terminal portion. The second region of the resin layer may include a flat second region portion located along the surface of the flat terminal portion, and a tilted second region portion connected to the flat second region portion and located along the surface of the tilted terminal portion. θ5 and θ6 may satisfy θ5>θ6, where θ5 may be an angle between the flat first region portion and a straight line extended from the tilted first region portion, and θ6 may be an angle between the flat second region portion and a straight line extended from the tilted second region portion.

A battery intermediate according to a third aspect of the present disclosure includes: a power generation element; a current collector terminal electrically connected to the power generation element; and a resin layer located along at least one surface in a thickness direction of the current collector terminal, the at least one surface being a surface of the current collector terminal. The current collector terminal includes a flat terminal portion with a constant thickness, and a tilted terminal portion connected to the flat terminal portion and thinned toward outside in a lateral direction of the current collector terminal. The tilted terminal portion is provided in at least one end portion of the current collector terminal in the lateral direction of the current collector terminal. The resin layer includes a flat resin layer portion located along a surface of the flat terminal portion, and a tilted resin layer portion connected to the flat resin layer portion and located along a surface of the tilted terminal portion. θ1 and θ2 satisfy θ1>θ2, where θ1 is an angle between the flat terminal portion and a straight line extended from the tilted terminal portion, and θ2 is an angle between the flat resin layer portion and a straight line extended from the tilted resin layer portion.

According to the present disclosure, gap formation between the current collector terminal and the outer body is reduced, and poor heat welding is reduced.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Method for Manufacturing a Battery

Figure 1:
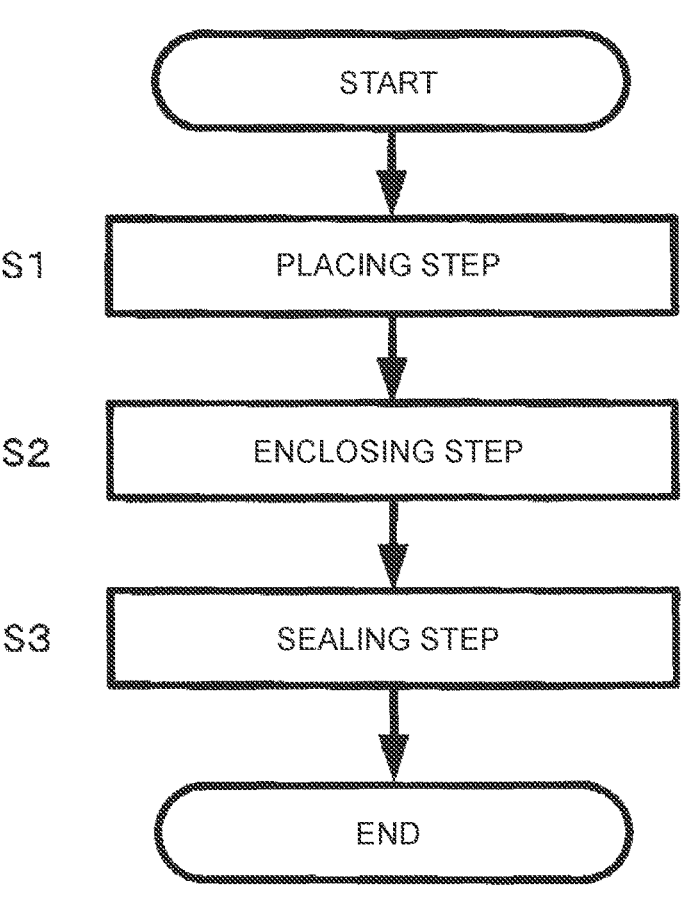
FIG. 1 is a flowchart of a method for manufacturing a battery according to an embodiment.
Figure 2:
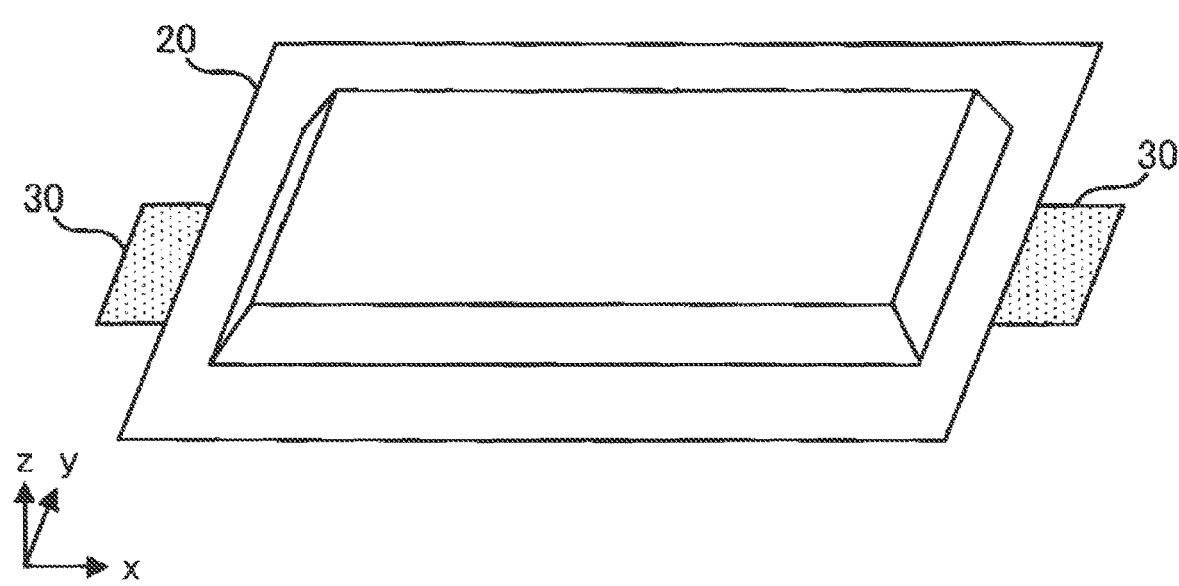
FIG. 2 is a perspective view of a battery 100 manufactured by the method for manufacturing a battery according to the embodiment.
Figures 3, 4:
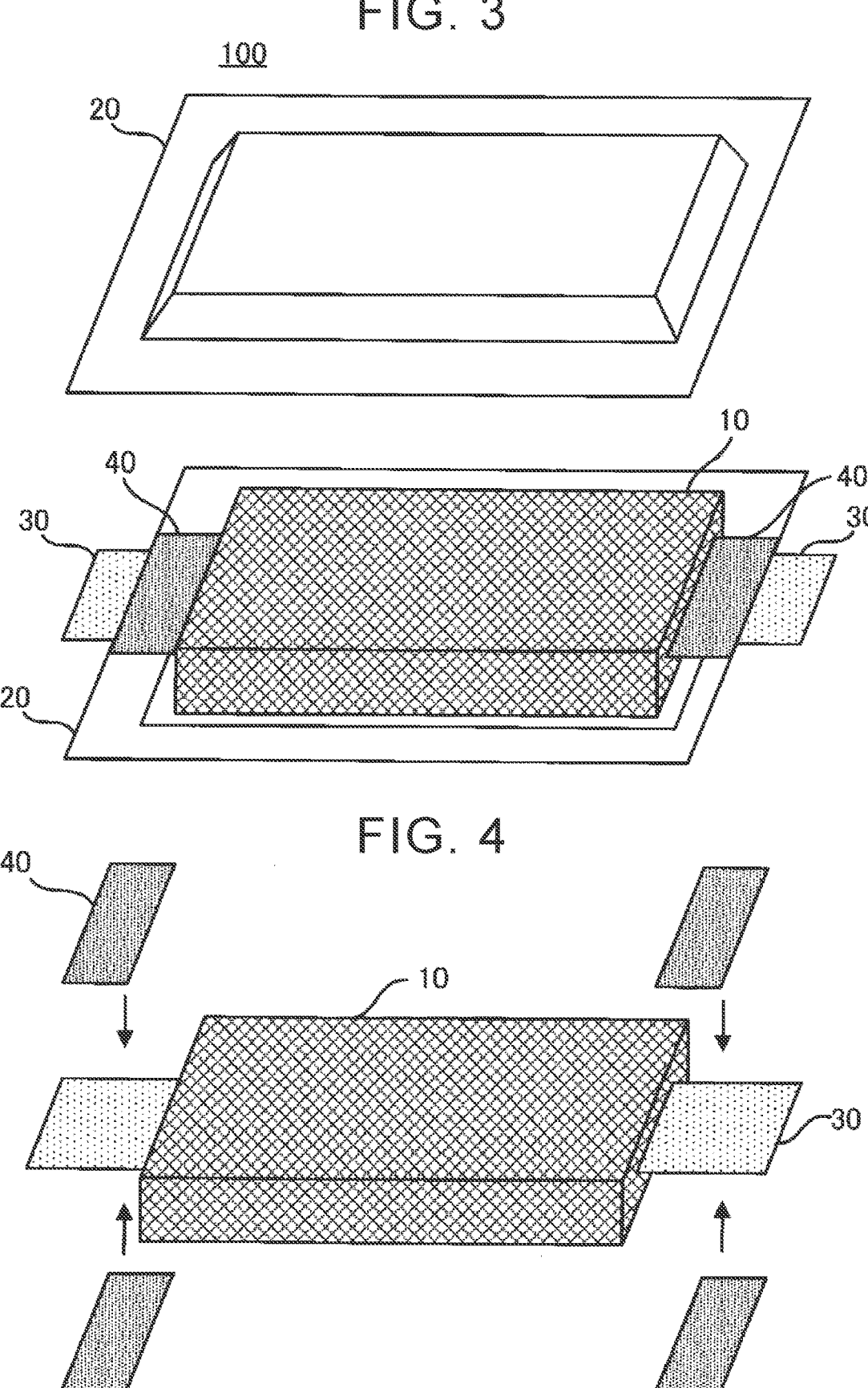
FIG. 3 is an exploded perspective view of the battery 100.
FIG. 4 is a perspective view showing in a simple way how resin layers 40 are placed on current collector terminals 30.

A method for manufacturing a battery according to the present disclosure will be described based on a method for manufacturing a battery according to an embodiment. FIG. 1 is a flowchart of the manufacturing method of the embodiment. FIG. 2 is a perspective view of a battery 100 manufactured by the manufacturing method of the embodiment. FIG. 3 is an exploded perspective view of the battery 100. In this specification, the x direction in FIG. 2 indicates the longitudinal direction (longitudinal direction of the battery 100), the y direction indicates the lateral direction (lateral direction of the battery 100), and the z direction indicates the thickness direction (thickness direction of the battery 100). The x, y, and z directions are orthogonal to each other.

The manufacturing method according to the embodiment is a method for manufacturing the battery 100 including a power generation element 10, an outer body 20 housing the power generation element 10, and a current collector terminal 30 electrically connected to the power generation element 10 and placed so as to extend to the outside from the outer body 20. As shown in FIG. 1, the manufacturing method according to the embodiment includes a placing step S1, an enclosing step S2, and a sealing step S3.

As shown in FIG. 3, in the manufacturing method according to the embodiment, the battery 100 is manufactured by placing a predetermined resin layer 40 on the current collector terminal 30. Each step will be described below.
Placing Step S1

The placing step S1 is the step of placing the resin layer 40 on at least one surface in the thickness direction of the current collector terminal 30 connected to the power generation element 10. A battery intermediate 90 can be manufactured by the placing step S1.

Figure 5:
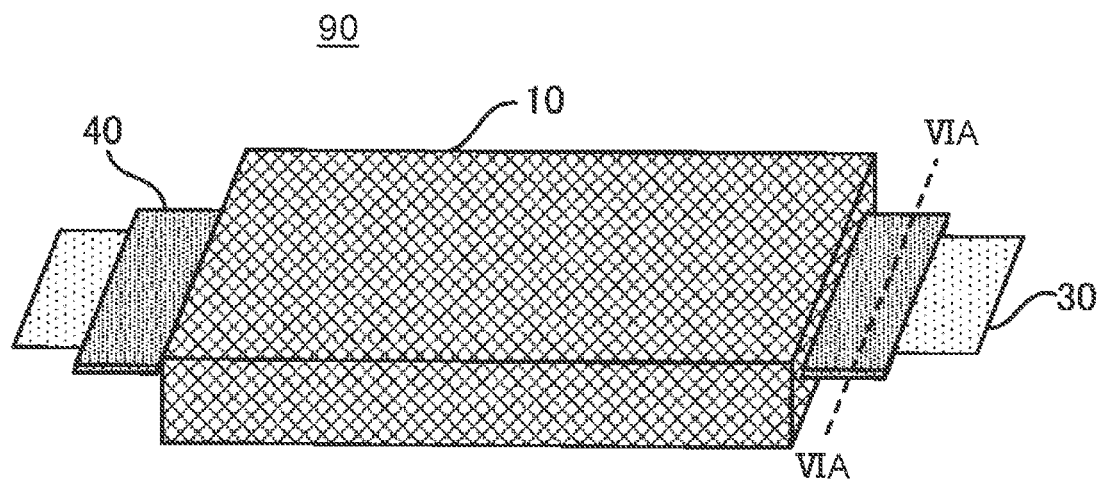
FIG. 5 is a perspective view of a battery intermediate 90 manufactured by a placing step S1.
Figure 6A:
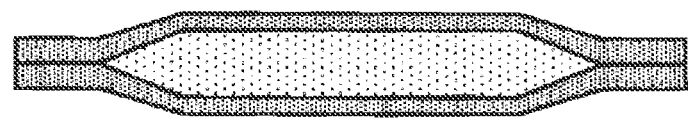
FIG. 6A is a cross-sectional view taken along line VIA-VIA in FIG. 5.
Figure 6B:
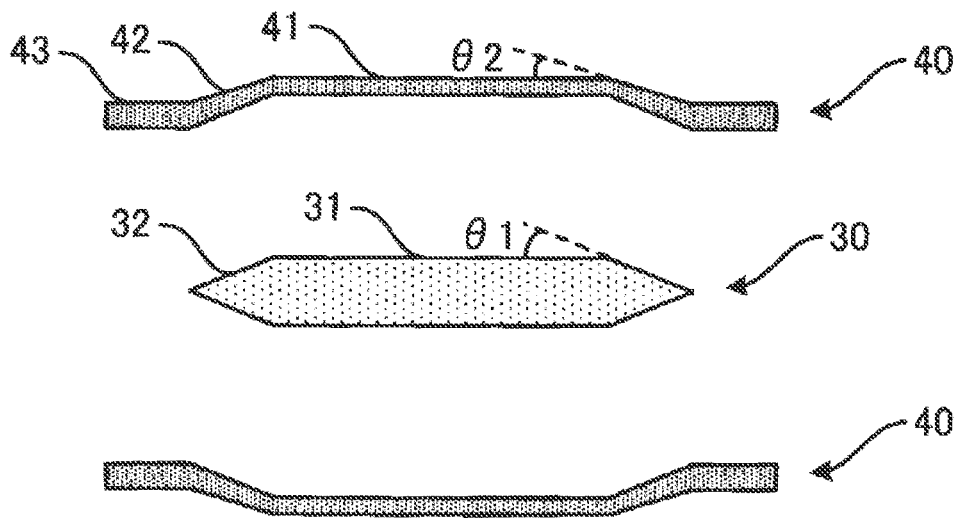
FIG. 6B is an exploded cross-sectional view of FIG. 6A.

FIG. 4 is a perspective view showing in a simple way how the resin layers 40 are placed on the current collector terminals 30. FIG. 5 is a perspective view of the battery intermediate 90. FIG. 6A is a cross-sectional view taken along line VIA-VIA in FIG. 5, and FIG. 6B is an exploded cross-sectional view of FIG. 6A.
Power Generation Element 10

The power generation element 10 may be a power generation element for a chemical battery such as a lithium-ion battery, a nickel metal hydride battery, or a nickel-cadmium battery. Alternatively, the power generation element 10 may be a power generation element for a physical battery such as a capacitor. The power generation element 10 may be a stacked type or a wound type. The power generation element 10 may be a solid-state battery or a liquid-state battery. The power generation element 10 for a stacked lithium-ion secondary battery will be illustrated below. However, the power generation element of the present disclosure is not limited to this.

The power generation element 10 is a stack of a positive electrode current collector foil, a positive electrode active material layer, an electrolyte layer, a negative electrode active material layer, and a negative electrode current collector foil (hereinafter these are sometimes collectively referred to as "electrode elements"). The electrode elements are stacked in the thickness direction. The number of electrode elements that are stacked is not particularly limited. The electrode elements may be stacked so as to be electrically in series, or may be stacked so as to be electrically in parallel.

The power generation element 10 is in the form of a sheet, and has a rectangular shape as viewed in plan. However, the power generation element 10 is not particularly limited as long as it has such a shape that it can be enclosed in the outer body 20. Each current collector foil of the power generation element 10 may be provided with a tab for connection to each current collector terminal 30. A positive electrode tab is provided on each positive electrode current collector foil, and is electrically connected to the positive electrode current collector terminal. Similarly, a negative electrode tab is provided on each negative electrode current collector foil, and is electrically connected to the negative electrode current collector terminal.

The positive electrode current collector foil and the negative electrode current collector foil are sheet-like metal foils. Although metals forming the positive electrode current collector foil and the negative electrode current collector foil are not particularly limited, examples of the metals include Cu, Ni, Cr, Au, Pt, Ag, Al, Fe, Ti, Zn, Co, and stainless steel. The metal forming the positive electrode current collector foil may be Al. The metal forming the negative electrode current collector foil may be Cu.

The positive electrode current collector foil and the negative electrode current collector foil may have, on their surfaces, some kind of coating layer (e.g., a carbon coating layer) for adjusting the resistance. The thickness of the positive electrode current collector foil and the negative electrode current collector foil may be, for example, 0.1 μm or more and 1 mm or less.

The positive electrode active material layer is a sheet-like layer containing a positive electrode active material. The positive electrode active material is not particularly limited as long as it is a positive electrode active material that can be used for lithium-ion secondary batteries. Examples of the positive electrode active material include various lithium-containing complex oxides such as lithium cobalt oxide, lithium nickel oxide, lithium manganese oxide, lithium nickel cobalt manganese oxide, and spinel-type lithium compounds.

The positive electrode active material layer may optionally contain a conductive aid and a binder. The binder is not particularly limited as long as it is a binder that can be used for lithium-ion secondary batteries. Examples of the binder include butadiene rubber (BR), butyl rubber (IIR), acrylate-butadiene rubber (ABR), and polyvinylidene fluoride (PVDF). The conductive aid is not particularly limited as long as it is a conductive aid that can be used for lithium-ion secondary batteries. Examples of the conductive aid include carbon materials such as acetylene black and Ketjen black, and metal materials such as nickel, aluminum, and stainless steel.

When the battery 100 is an all-solid-state battery, the positive electrode active material layer may optionally contain a solid electrolyte. The solid electrolyte is not particularly limited as long as it is a solid electrolyte that can be used for lithium-ion secondary batteries. For example, the solid electrolyte may be an organic polymer electrolyte, or may be an inorganic solid electrolyte. The solid electrolyte is preferably an inorganic solid electrolyte. This is because inorganic solid electrolytes have higher ionic conductivity and higher heat resistance than organic polymer electrolytes. The inorganic solid electrolyte may be an oxide solid electrolyte, or may be a sulfide solid electrolyte. The inorganic solid electrolyte is preferably a sulfide solid electrolyte. Examples of the oxide solid electrolyte include lithium lanthanum zirconate, LiPON, $Li_{1+X}AlXGe_{2-X}(PO_4)_3$, Li—SiO glass, and Li—Al—S—O glass. Examples of the sulfide solid electrolyte include $Li_2S$—$P_2S_5$, $Li_2S$—$SiS_2$, LiI—$Li_2S$—$SiS_2$, LiI—$Si_2S$—$P_2S_5$, $Li_2S$—$P_2S_5$—LiI—LiBr, LiI—$Li_2S$—$P_2S_5$, LiI—$Li_2S$—$P_2O_5$, LiI—$Li_3PO_4$—$P_2S_5$, and $Li_2S$—$P_2S_5$—$GeS_2$.

The content of each component in the positive electrode active material layer may be set as appropriate according to the purpose. The surface of the positive electrode active material may be coated with an oxide layer such as a lithium niobate layer, a lithium titanate layer, or a lithium phosphate layer. The thickness of the positive electrode active material layer may be, for example, 0.1 μm or more and 1 mm or less.

The negative electrode active material layer is a sheet-like layer containing a negative electrode active material. The negative electrode active material is not particularly limited as long as it is a negative electrode active material that can be used for lithium-ion secondary batteries. Examples of the negative electrode active material include Si and Si alloys, silicon active materials such as silicon oxide, carbon active materials such as graphite and hard carbon, various oxide active materials such as lithium titanate, and metallic lithium and lithium alloys.

The negative electrode active material layer may optionally contain a conductive aid and a binder. The conductive aid and the binder can be selected as appropriate from the conductive aids and binders that can be used for the positive electrode active material layer. When the battery 100 is an all-solid-state battery, the negative electrode active material layer may optionally contain a solid electrolyte. The solid electrolyte can be selected as appropriate from the solid electrolytes that can be used for the positive electrode active material layer.

The content of each component in the negative electrode active material layer may be set as appropriate according to the purpose. The thickness of the negative electrode active material layer may be, for example, 0.1 μm or more and 1 mm or less.

When the battery 100 is an all-solid-state battery, the electrolyte layer is a sheet-like solid electrolyte layer. The solid electrolyte layer contains a solid electrolyte. The solid electrolyte can be selected as appropriate from the solid electrolytes that can be used for the positive electrode active material layer. The solid electrolyte layer may optionally contain a binder. The binder can be selected as appropriate from the binders that can be used for the positive electrode active material layer. The content of each component in the solid electrolyte layer may be set as appropriate according to the purpose. The thickness of the solid electrolyte layer may be, for example, 0.1 μm or more and 1 mm or less.

When the battery 100 is a liquid-state battery, the electrolyte layer includes an electrolytic solution and a separator. The electrolytic solution and the separator are not particularly limited as long as they are an electrolytic solution and a separator that can be used for lithium-ion secondary batteries. Examples of the separator include porous sheets (films) made of polyolefin such as polyethylene (PE) and polypropylene (PP). The thickness of the separator may be, for example, 0.1 μm or more and 1 mm or less. The electrolytic solution usually contains a non-aqueous solvent and a supporting salt. Examples of the non-aqueous solvent include carbonates, ethers, esters, nitriles, sulfones, and lactones. Examples of the supporting salt include $LiPF_6$, $LiBF_4$, lithium bis(fluorosulfonyl)imide (LiFSI), and lithium bis(trifluoromethane)sulfonimide (LiTFSI). The concentration of the supporting salt in the electrolytic solution is not particularly limited, but may be, for example, 0.5 mol/L or more and 5 mol/L or less. The electrolytic solution may contain any desired component such as a gas generating agent, a coating film-forming agent, a dispersant, and a thickener.

Current Collector Terminal 30

The current collector terminal 30 is electrically connected to the power generation element 10, and is placed to extend to the outside from the outer body 20. The current collector terminal 30 has a positive electrode current collector terminal and a negative electrode current collector terminal. The positive electrode current collector terminal is connected to the positive electrode current collector foil, and the negative electrode current collector terminal is connected to the negative electrode current collector foil. The manner in which the positive electrode current collector terminal and the negative electrode current collector terminal are placed is not particularly limited. The positive electrode current collector terminal and the negative electrode current collector terminal may be placed on the opposing surfaces of the power generation element 10 as shown in FIG. 2, or may be placed on the same surface of the power generation element 10. The material of the current collector terminal 30 is not particularly limited, and can be selected as appropriate from the metals that are used for each current collector foil. For example, the current collector terminal 30 may be made of the same metal as each current collector foil. The metal forming the positive electrode current collector terminal may be Al. The metal forming the negative electrode current collector terminal may be Cu.

Figure 7A:
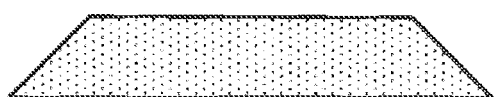
FIG. 7A is another embodiment of the current collector terminal 30.
Figure 7B:
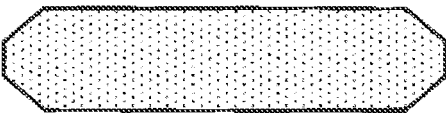
FIG. 7B is still another embodiment of the current collector terminal 30.

The current collector terminal 30 includes a flat terminal portion 31 with a constant thickness, and a tilted terminal portion 32 connected to the flat terminal portion 31 and thinned as it gets closer to the outside in the lateral direction. The tilted terminal portion 32 is formed in at least one end portion in the lateral direction of the current collector terminal 30. With this configuration, a gap is less likely to form between the current collector terminal 30 and the outer body 20 in the manufactured battery 100. In order to further enhance the effect, the current collector terminal 30 may have tilted terminal portions 32 in its both end portions in the lateral direction. FIG. 6B shows a form in which the current collector terminal 30 has the tilted terminal portions 32 in its both end portions in the lateral direction. Other embodiments of the current collector terminal 30 having the tilted terminal portions 32 in its both end portions in the lateral direction include the forms shown in FIGS. 7A and 7B. The current collector terminal 30 may have a hexagonal cross section as shown in FIG. 6B, a trapezoidal cross section as shown in FIG. 7A, or an octagonal cross section as shown in FIG. 7B. As shown in FIGS. 6B and 7B, the current collector terminal 30 may include the tilted terminal portions 32 on both surfaces in the thickness direction of the end portions. This configuration can further reduce gap formation.

The length in the longitudinal direction of the current collector terminal 30 is not particularly limited, and may be set as appropriate. The length in the lateral direction of the current collector terminal 30 is not particularly limited, and may be set as appropriate. The length in the lateral direction of the flat terminal portion 31 may be 20% or more of the length in the lateral direction of the current collector terminal 30, or may be 90% or less of the length in the lateral direction of the current collector terminal 30. The length in the lateral direction of the tilted terminal portion 32 may be 10% or more of the length in the lateral direction of the current collector terminal 30, or may be 80% or less of the length in the lateral direction of the current collector terminal 30. With the lengths in the lateral direction of the flat terminal portion 31 and the tilted terminal portion 32 being within the above, gap formation can further be reduced.

The thickness of the current collector terminal 30 (thickness of the flat terminal portion 31) is not particularly limited, but may be relatively large. The thickness of the current collector terminal 30 (thickness of the flat terminal portion 31) may be, for example, 1 mm or more, and may be 5 mm or less. When the current collector terminal 30 is thick, a gap tends to form between the current collector terminal 30 and the outer body 20. However, since the current collector terminal 30 has the tilted terminal portion 32, gap formation can be reduced. In combination with the effects of a resin layer 40 that will be described later, gap formation can further be reduced.

Resin Layer 40

A resin layer 40 is placed along at least one surface in the thickness direction of the current collector terminal 30. As shown in FIGS. 5, 6A, and 6B, the resin layer 40 may be placed along both surfaces in the thickness direction of the current collector terminal 30. Since the resin layer 40 is a member to be heat welded to the outer body 20, the resin layer 40 is made of a thermoplastic resin. Examples of the thermoplastic resin include: crystalline resins such as polyolefins like polyethylene (PE) and polypropylene (PP) and polyesters like polyethylene terephthalate (PET); and non-crystalline resins such as polystyrene and polyvinyl chloride. The length in the lateral direction of the resin layer 40 need only be greater than the length in the lateral direction of the current collector terminal 30. The length in the longitudinal direction of the resin layer 40 need only be greater than the length in the longitudinal direction of the region to be heat welded.

The resin layer 40 includes a flat resin layer portion 41 placed along the surface of the flat terminal portion 31, and a tilted resin layer portion 42 connected to the flat resin layer portion 41 and placed along the surface of the tilted terminal portion 32. The resin layer 40 may include a resin layer end portion 43 connected to the tilted resin layer portion 42.

Although the thickness of the resin layer 40 is not particularly limited, a resin layer relatively thicker than a resin layer with a thickness of about 100 μm is used. For example, the thickness of the resin layer 40 may be 250 μm or more, and may be 400 μm or less. The reason why the resin layer 40 is thus made relatively thick is for θ1 and θ2 that will be described later to satisfy θ1>θ2. In other words, the resin layer 40 is made relatively thick in order to make the tilt of the tilted resin layer portion 42 smaller than the tilt of the tilted terminal portion 32. The thickness of the tilted resin layer portion 42 thus increases as it gets closer to the outside in the lateral direction.

Placing Step S1

The placing step S1 is characterized by placing the resin layer 40 on the current collector terminal 30 so that θ1 and θ2 satisfy θ1>θ2, where θ1 is the angle between the flat terminal portion 31 and a straight line extended from the tilted terminal portion 32, and θ2 is the angle between the flat resin layer portion 41 and a straight line extended from the tilted resin layer portion 42, as shown in FIG. 6B. θ2 is the angle of the outer surface of the resin layer 40. When θ1 and θ2 satisfy θ1≤θ2, a gap may form between the current collector terminal 30 and the outer body 20 due to a manufacturing tolerance in the sealing step S3 that will be described later. The manufacturing tolerance refers to a tolerance of displacement of a heat bar in the sealing step S3, the size of the heat bar, the size of the current collector terminal, etc. With θ1 and θ2 satisfying θ1>θ2 after the placing step S1, gap formation can be reduced even if a manufacturing tolerance occurs in the sealing step S3. This effect will be described in detail in the sealing step S3.

θ1 and θ2 are not particularly limited as long as they satisfy θ1>θ2. For example, θ1 may be 30° or more, and may be 60° or less. θ2 may be 10° or more, and may be 40° or less. The difference between θ1 and θ2 may be 10° or more, and may be 30° or less.

Although the method for placing the resin layer 40 on the current collector terminal 30 so that θ1 and θ2 satisfy θ1>θ2 is not particularly limited, the resin layer 40 can be placed on the current collector terminal 30 in, for example, the following manners. One method is to form the current collector terminal 30 and the resin layer 40 so that θ1 and θ2 satisfy θ1>θ2 and place the resin layer 40 along the surface of the current collector terminal 30 as shown in FIG. 4

Figure 8A:
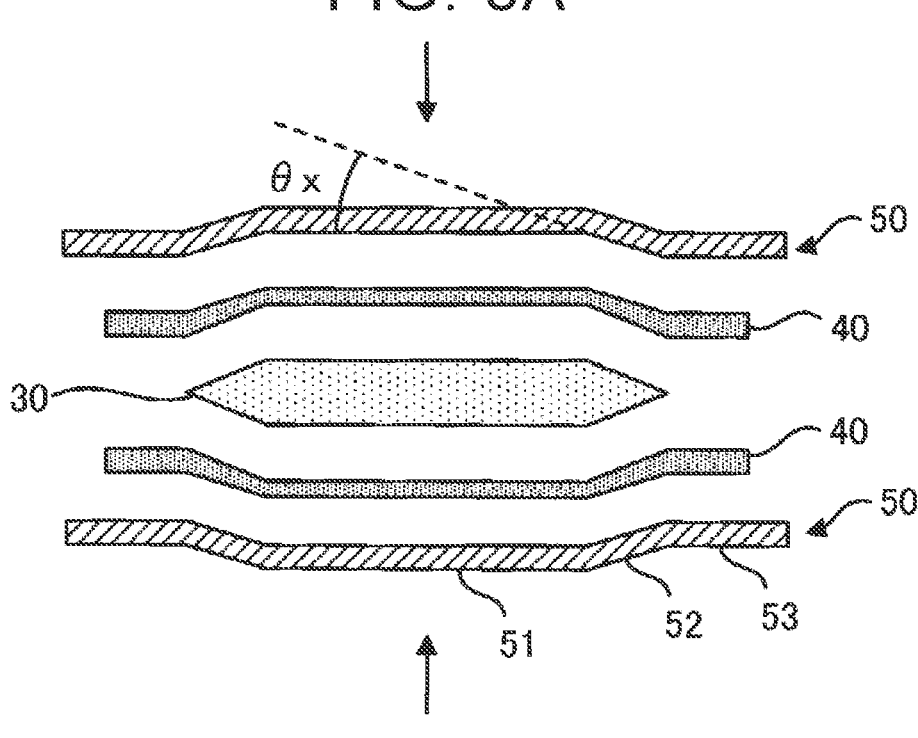
FIG. 8A shows in chronological order how the resin layers 40 are heat welded to the current collector terminal 30 using heat bars 50.
Figure 8B:
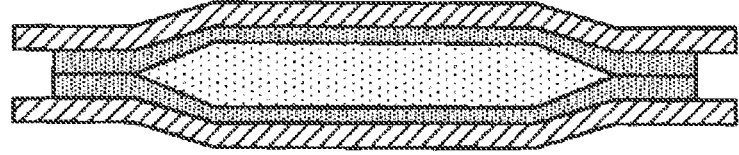
FIG. 8B shows in chronological order how the resin layers 40 are heat welded to the current collector terminal 30 using the heat bars 50.
Figure 8C:
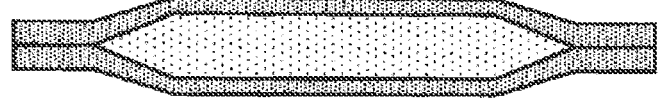
FIG. 8C shows in chronological order how the resin layers 40 are heat welded to the current collector terminal 30 using the heat bars 50.

Another method is to heat weld the resin layer 40 to the current collector terminal 30 using a heat bar 50. FIGS. 8A to 8C show in chronological order how the resin layers 40 are heat welded to the current collector terminal 30 using the heat bars 50. As shown in FIG. 8A, the resin layers 40 are placed outside the current collector terminal 30, and the heat bars 50 are placed outside the resin layers 40. As shown in FIG. 8B, the current collector terminal 30 and the resin layers 40 are then sandwiched between the two heat bars 50 and heated. The resin layers 40 can thus be placed in close contact with the current collector terminal 30. The resin layer end portions 43 are also heat welded together, so that the resin layers 40 can be fixed to the current collector terminal 30. As shown in FIG. 8C, the heat bars 50 are then removed from the resin layers 40. The resin layers 40 can thus be placed on the current collector terminal 30 by sandwiching the current collector terminal 30 between the resin layers 40 and then sandwiching the current collector terminal 30 with the resin layers 40 on both sides between the heat bars 50.

The shape of the heat bar 50 is set so that θ2 of the resin layer 40 is a predetermined angle. The heat bar 50 includes a flat heat bar portion 51 with a constant thickness and a tilted heat bar portion 52 connected to the flat heat bar portion 51. The flat heat bar portion 51 is a portion corresponding to the flat resin layer portion 41, and the tilted heat bar portion 52 is a portion corresponding to the tilted resin layer portion 42. The shape of the heat bar 50 is set so that θx=θ2, where θx is the angle between the flat heat bar portion 51 and a straight line extended from the tilted heat bar portion 52. θx is the angle of the inner surface of the heat bar 50. By using such a heat bar 50, the resin layer 40 can be placed on the current collector terminal 30 while forming the resin layer 40 so that θ2 becomes the predetermined angle. The heat bar 50 may include a heat bar end portion 53 connected to the tilted heat bar portion 52. The heat bar end portion 53 is a portion corresponding to the resin layer end portion 43.

Although the resin layer 40 that has already been formed is used in FIGS. 8A to 8C, the resin layer 40 that can be used in the placing step S1 is not limited to this, and a flat resin layer may be used. This is because even when a flat sheet-like resin layer is used, the resin layer can be formed into a desired shape by the heat bar 50.

The temperature of the heat bar 50 is not particularly limited, and is set as appropriate according to the melting temperature of the resin layer 40. For example, the temperature of the heat bar 50 may be 150° C. or more, and may be 200° C. or less. The pressure of the heat bars 50 when sandwiching the current collector terminal 30 and the resin layers 40 is not particularly limited, and may be any pressure as long as the current collector terminal 30 and the resin layers 40 can be appropriately heat welded. The pressure of the heat bars 50 when sandwiching the current collector terminal 30 and the resin layers 40 may also be any pressure as long as the resin layers 40 can be formed into a desired shape. For example, the pressure of the heat bars 50 when sandwiching the current collector terminal 30 and the resin layers 40 may be 0.1 MPa or more, and may be 1 MPa or less. The heat bar 50 may be, for example, a known heat bar made of silicone rubber.

Enclosing Step S2

The enclosing step S2 is the step of enclosing the power generation element 10 with the resin layer 40 placed thereon in the outer body 20. At this time, the power generation element 10 is enclosed in the outer body 20 so that the current collector terminal 30 extends to the outside from the outer body 20. The outer body 20 is placed so that the resin layer 40 is located between the current collector terminal 30 and the outer body 20. This is because the resin layer 40 and the outer body 20 will be heat welded together in the sealing step S3 that will be described later.

Outer Body 20

An outer body having a heat welding layer is used as the outer body 20. An example of such an outer body is a metal laminated film. A metal laminated film typically includes a metal layer and a resin layer covering the metal layer.

The metal layer of the metal laminated film serves as a gas barrier layer. The gas barrier layer is a layer that does not allow moisture, air, or gas generated inside the battery 100 to enter or leave the battery 100. The metal layer may be made of a metal material such as, for example, aluminum, iron, or stainless steel.

Although the resin layer is provided on both surfaces of the metal layer, the function of the resin layer is different depending on the surface of the metal layer. For example, a heat welding layer is used as the resin layer provided on the surface to be heat welded (usually the inner surface). The heat welding layer contains a thermoplastic resin. Examples of the thermoplastic resin include: crystalline resins such as polyolefins like polyethylene (PE) and polypropylene (PP) and polyesters like polyethylene terephthalate (PET); and non-crystalline resins such as polystyrene and polyvinyl chloride. On the other hand, a protective layer is used as the resin layer provided on the surface not to be heat welded (usually the outer surface). A resin serving as a protective layer is used as appropriate as the protective layer. Examples of such a resin include polyesters such as PET, and polyamides (nylons).

When a metal laminated film is used as the outer body 20, the power generation element 10 is sandwiched between two metal laminated films, as shown in FIGS. 2 and 3. Alternatively, one metal laminated film is folded to sandwich the power generation element 10. At this time, the metal laminated film(s) are placed such that the heat welding layers are located on top of each other. The metal laminated film(s) may have a protruding portion for enclosing the power generation element 10. The two metal laminated films may have the protruding portion, or one of the metal laminated films may have the protruding portion. The power generation element 10 can be enclosed in the outer body 20 by this method.

Figure 9A:
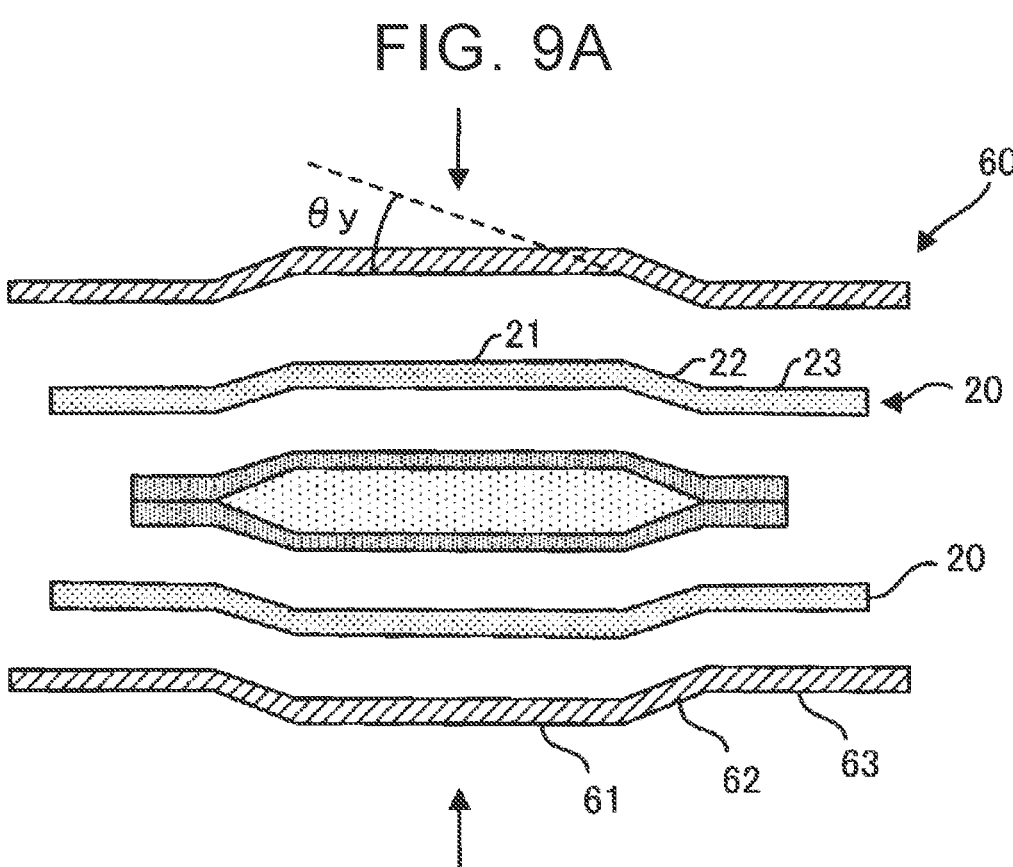
FIG. 9A shows in chronological order how the resin layers 40 and an outer body 20 are heat welded using heat bars 60.

An end portion on the current collector terminal 30 side of the outer body 20 may be formed as shown in FIG. 9A. In this case, the end portion on the current collector terminal 30 side of the outer body 20 may include a flat outer body portion 21 and a tilted outer body portion 22 connected to the flat outer body portion 21. The flat outer body portion 21 is a portion corresponding to the flat resin layer portion 41, and the tilted outer body portion 22 is a portion corresponding to the tilted resin layer portion 42. The end portion on the current collector terminal 30 side of the outer body 20 may have an outer body end portion 23 connected to the tilted outer body portion 22. The outer body end portion 23 is a portion corresponding to the resin layer end portion 43.

Sealing Step S3

The sealing step S3 is the step of sealing the power generation element 10 inside the outer body 20 by heat welding. Specifically, the sealing step S3 is the step of heat welding the end portions of the outer body 20 to seal the power generation element 10 inside the outer body 20. Since the resin layer 40 is located between the current collector terminal 30 and the outer body 20 at this time, the resin layer 40 and the outer body 20 are heat welded together in the sealing step S3.

Although heat welding of the outer body 20 can be performed by a known method, heat welding of the resin layer 40 and the outer body 20, that is, heat welding of the end portions on the current collector terminal 30 side of the outer body 20, is performed by using an angled heat bar 60.

Figure 9B:
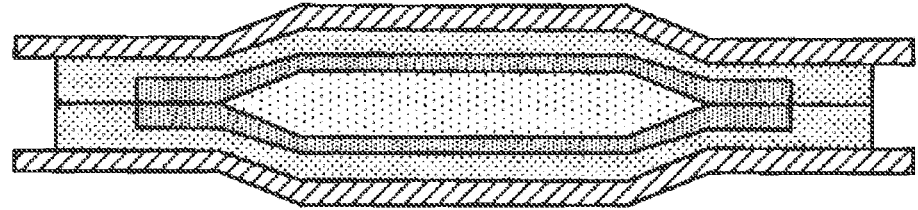
FIG. 9B shows in chronological order how the resin layers 40 and the outer body 20 are heat welded using the heat bars 60.
Figure 9C:
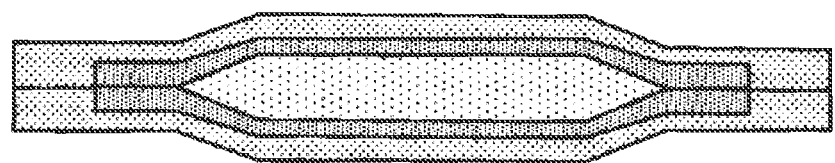
FIG. 9C shows in chronological order how the resin layers 40 and the outer body 20 are heat welded using the heat bars 60.

FIGS. 9A to 9C show in chronological order how the resin layers 40 and the outer body 20 are heat welded using the heat bars 60. As shown in FIG. 9A, the outer body 20 is placed outside the current collector terminal 30 with the resin layers 40 placed thereon, and the heat bars 60 are placed outside the outer body 20. As shown in FIG. 9B, the end portion on the current collector terminal 30 side of the outer body 20 is sandwiched between the two heat bars 60 and heated. The resin layers 40 placed on the current collector terminal 30 and the outer body 20 are thus heat welded. The portions of the outer body 20 that are located laterally outside the end portions of the resin layers 40 are also heat welded together. As shown in FIG. 9C, the heat bars 60 are then removed from the outer body 20. The resin layers 40 and the outer body 20 are heat welded by thus sandwiching the end portion of the outer body 20 where the current collector terminal 30 is placed between the heat bars 60.

Like the heat bar 50, the heat bar 60 includes a flat heat bar portion 61 with a constant thickness and a tilted heat bar portion 62 connected to the flat heat bar portion 61. The flat heat bar portion 61 is a portion corresponding to the flat outer body portion 21, and the tilted heat bar portion 62 is a portion corresponding to the tilted outer body portion 22. The shape of the heat bar 60 is set so that $\theta 1 \geq \theta y > \theta 2$, where $\theta y$ is the angle between the flat heat bar portion 61 and a straight line extended from the tilted heat bar portion 62. $\theta y$ is the angle of the inner surface of the heat bar 60. A gap is less likely to form between the current collector terminal 30 (resin layer 40) and the outer body 20 by setting $\theta y$ to an angle satisfying this relationship.

Figure 10A:
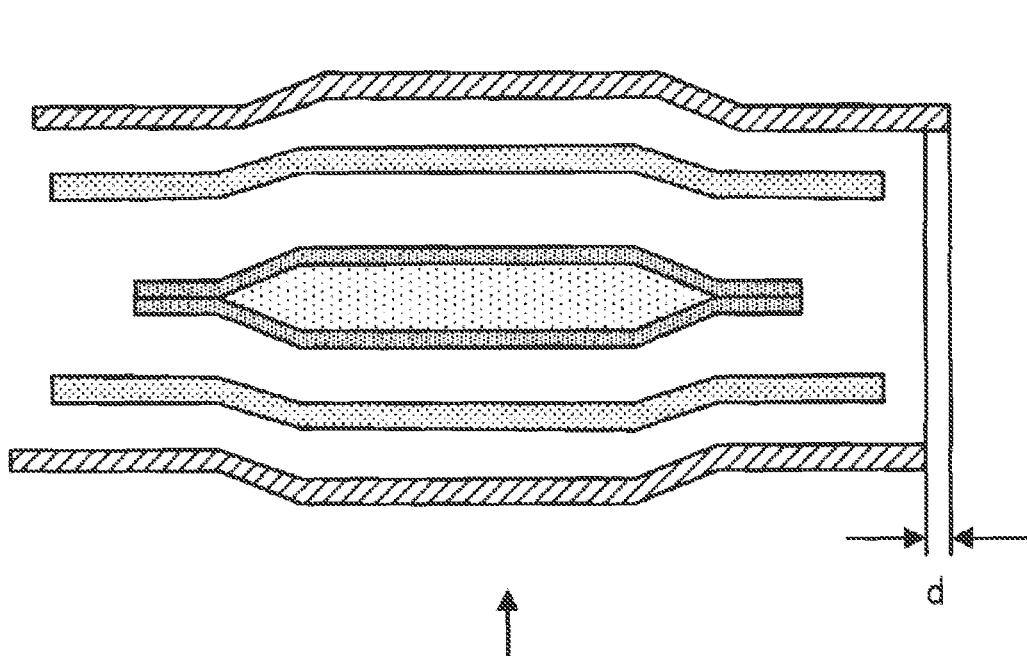
FIG. 10A is a schematic diagram illustrating the case where a sealing step is performed using a battery intermediate satisfying θ1≤θ2.
Figure 10B:
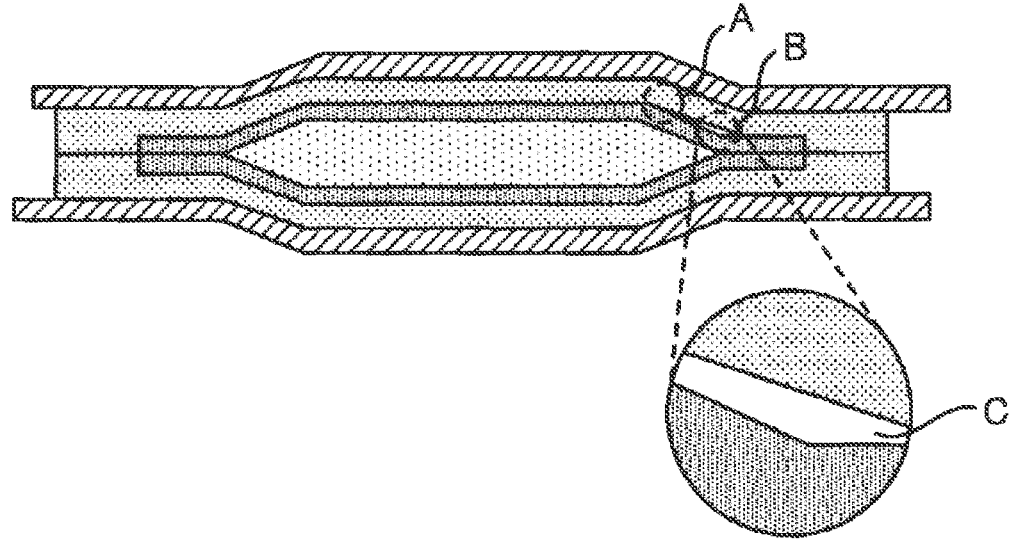
FIG. 10B is a cross-sectional view of a battery after the sealing step is performed using the battery intermediate satisfying θ1≤θ2.

FIGS. 10A and 10B are schematic diagrams illustrating the case where the sealing step is performed using a battery intermediate satisfying θ1≤θ2. FIG. 10A is a diagram corresponding to FIG. 9A. As shown in FIG. 10A, the upper heat bar is displaced from a predetermined position. Namely, there is a manufacturing tolerance d. The following occurs when heat welding is performed in this state. As shown by dashed line A in FIG. 10B, in the upper part of the tilted resin layer portion, the resin layer melts and flows outward in the lateral direction due to the heat of the heat bar, so that the resin layer is heat welded to the outer body. As shown by dashed line B in FIG. 10B, however, in the lower part of the tilted resin layer portion, a gap C forms between the resin layer and the outer body. As described above, when θ1≤θ2, a gap may form due to manufacturing tolerance.

On the other hand, when θ1>θ2, the tilted resin layer portion 42 has such a structure that its thickness increases as it gets closer to the outside in the lateral direction. Therefore, gap formation in the outer part in the lateral direction of the tilted resin layer portion 42 can be reduced even if such a manufacturing tolerance occurs.

The heat bar 60 may include a heat bar end portion 63 connected to the tilted heat bar portion 62. With this configuration, the resin layer end portion 43 and the outer body end portion 23 can be heat welded together, and the outer body end portions 23 located outside the resin layer end portion 43 can be heat welded together.

In FIGS. 9A to 9C, the outer body 20 whose end portions on the current collector terminal 30 side have already been formed is used. However, the shape of the end portions of the outer body 20 that can be used in the sealing step S3 is not limited to this, and an outer body having flat end portions may be used. This is because even when such an outer body is used, the outer body can be formed into a desired shape by the heat bar 60.

The temperature of the heat bar 60 is not particularly limited, and is set as appropriate according to the heat welding temperature of the outer body 20 and the resin layer 40. For example, the temperature of the heat bar 60 may be 150° C. or more, and may be 200° C. or less. The pressure of the heat bars 60 when sandwiching the current collector terminal 30, the resin layers 40, and the outer body 20 is not particularly limited, and may be any pressure as long as the outer body 20 and the resin layers 40 can be appropriately heat welded. The pressure of the heat bars 60 when sandwiching the current collector terminal 30, the resin layers 40, and the outer body 20 may also be any pressure as long as the outer body 20 can be formed into a desired shape. The pressure of the heat bars 60 when sandwiching the current collector terminal 30, the resin layers 40, and the outer body 20 may be 0.1 MPa or more, and may be 1 MPa or less. The heat bar 60 may be, for example, a known heat bar made of silicone rubber.

Battery 100

The battery 100 can be manufactured by the sealing step S3. As described above, gap formation is reduced in the battery 100. Such a battery 100 has the following structural features.

Figure 11:
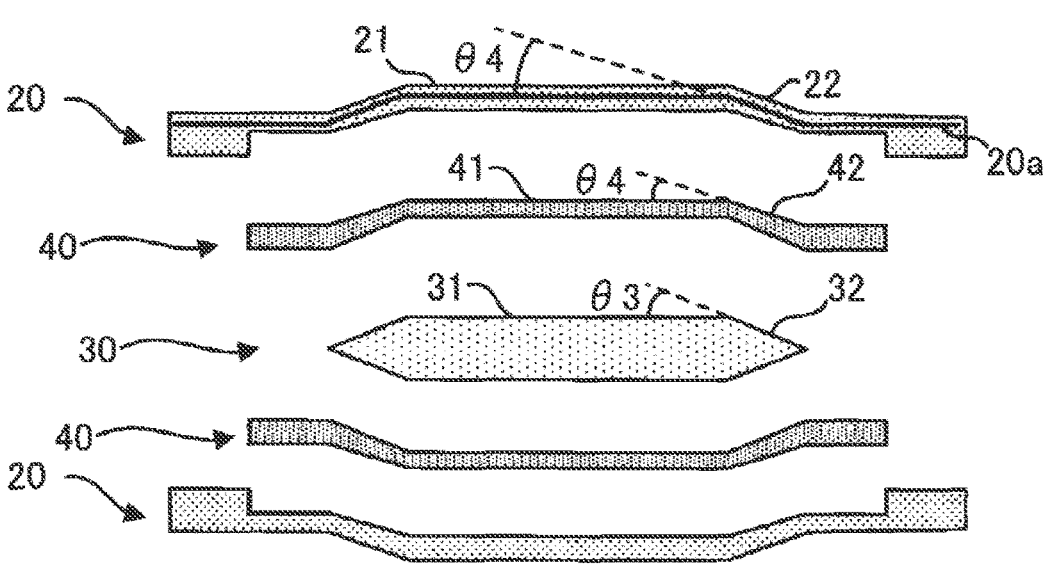
FIG. 11 is an exploded cross-sectional view of a portion where the resin layers 40 and the outer body 20 are heat welded.

FIG. 11 is an exploded cross-sectional view of a portion where the resin layers 40 and the outer body 20 are heat welded in the battery 100 manufactured by the sealing step S3. A metal layer 20*a* in the outer body 20 is shown only in the outer body 20 placed on the upper side. As shown in FIG. 11, θ3 is the angle between the flat terminal portion 31 and a straight line extended from the tilted terminal portion 32, and θ4 is the angle between the flat resin layer portion 41 and a straight line extended from the tilted resin layer portion 42. The relationship between θ3 and θ4 may change depending on the conditions of the sealing step S3. This is because, when the resin layer 40 and the resin layer on the inner surface of the outer body 20 are heat welded together in the sealing step S3, the boundary between the resin layer 40 and the resin layer of the outer body 20 in the manufactured battery 100 is often unclear. Therefore, the angle of the inner surface of the metal layer 20*a* of the outer body 20 may be regarded as θ4. Specifically, as shown in FIG. 11, the angle of the inner surface of the metal layer 20*a* of the outer body 20, namely the angle between the inner surface of the metal layer 20*a* in the flat outer body portion 21 and a straight line extended from the inner surface of the metal layer 20*a* in the tilted outer body portion 22, may be regarded as θ4.

When θy of the heat bar 60 satisfies θ1>θy>θ2 in the sealing step S3, θ3 and θ4 of the battery 100 satisfy θ3>θ4. This is the same as the relationship between θ1 and θ2. However, although θ1 and θ3 have almost the same value, θ2 and θ4 sometimes have completely different values. This is because, due to the heat welding using the heat bar 60, the resin layer 40 melts and the angle between the flat resin layer portion 41 and a straight line extended from the tilted resin layer portion 42 may change. Therefore, θ1 and θ3 have the relationship of θ1≈θ3, and θ2 and θ4 have the relationship of θ4≥θ2. When the angle between the flat resin layer portion 41 and the straight line extended from the tilted resin layer portion 42 changes, θ2 and θ4 have the relationship of θ4>θ2. The battery 100 has the following structural features when θ4>θ2.

Figure 12:
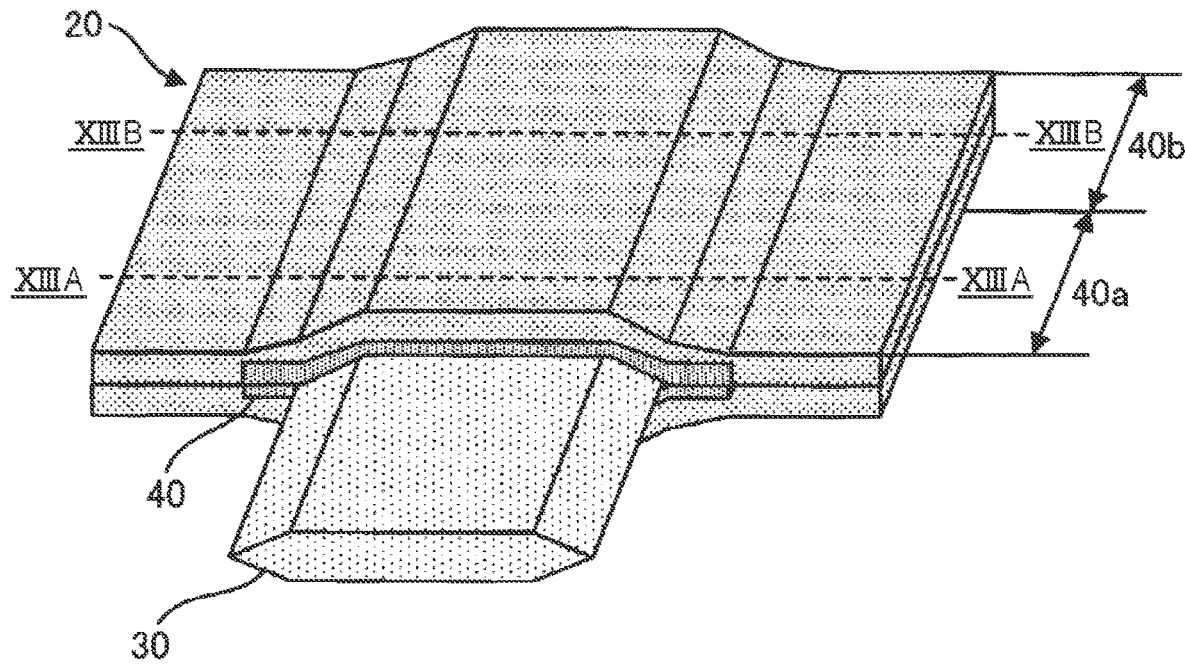
FIG. 12 is a perspective view of a portion around the current collector terminal 30 of the battery 100.

FIG. 12 is a cut-away perspective view of a portion around one current collector terminal 30 of the battery 100. As shown in FIG. 12, the resin layer 40 has, in the longitudinal direction, a first region 40*a* welded to the outer body 20 and a second region 40*b* not welded to the outer body 20. The first region 40*a* is, in other words, a portion where the resin layer 40 and the outer body 20 are heat welded by the heat bar 60. The second region 40*b* is, in other words, a portion not affected by the heat bar 60, where the resin layer 40 and the outer body 20 are not heat welded.

Figure 13A:
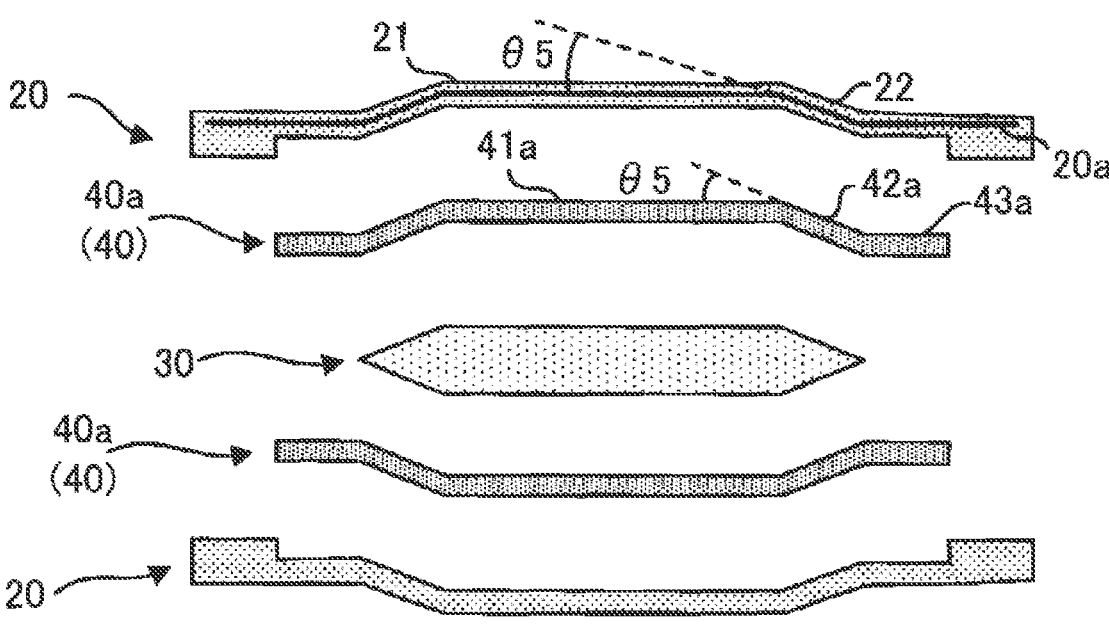
FIG. 13A is an exploded cross-sectional view taken along line XIIIA-XIIIA in FIG. 12 (exploded cross-sectional view of a first region 40a)
Figure 13B:
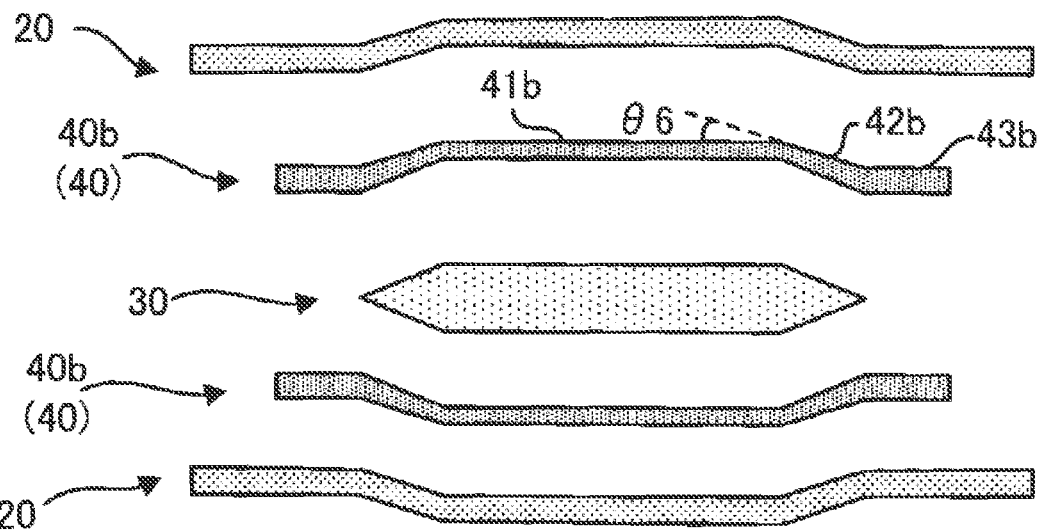
FIG. 13B is an exploded cross-sectional view taken along line XIIIB-XIIIB in FIG. 12 (exploded cross-sectional view of a second region 40b).

FIG. 13A is an exploded cross-sectional view taken along line XIIIA-XIIIA in FIG. 12 (exploded cross-sectional view of the first region 40*a*), and FIG. 13B is an exploded cross-sectional view taken along line XIIIB-XIIIB in FIG. 12 (exploded cross-sectional view of the second region 40*b*).

As shown in FIG. 13A, the first region 40*a* of the resin layer 40 includes a flat first region portion 41*a* placed along the surface of the flat terminal portion 31, and a tilted first region portion 42*a* connected to the flat first region portion 41*a* and placed along the surface of the tilted terminal portion 32. The first region 40*a* may include a first region end portion 43*a* connected to the tilted first region portion 42*a*. As shown in FIG. 13B, the second region 40*b* of the resin layer 40 includes a flat second region portion 41*b* placed along the surface of the flat terminal portion 31, and a tilted second region portion 42*b* connected to the flat second region portion 41*b* and placed along the surface of the tilted terminal portion 32. The second region 40*b* may include a second region end portion 43*b* connected to the tilted second region portion 42*b*. The flat first region portion 41*a* and the flat second region portion 41*b* correspond to the flat resin layer portion 41, the tilted first region portion 42*a* and the tilted second region portion 42*b* correspond to the tilted resin layer portion 42, and the first region end portion 43*a* and the second region end portion 43*b* correspond to the resin layer end portion 43.

θ5 and θ6 satisfy θ5>θ6, where θ5 is the angle between the flat first region portion 41*a* and a straight line extended from the tilted first region portion 42*a*, and θ6 is the angle between the flat second region portion 41*b* and a straight line extended from the tilted second region portion 42*b*. θ5 corresponds to θ4, and θ6 corresponds to θ2. As described above, the boundary between the resin layer 40 and the resin layer of the outer body 20 as a result of heat welding is often unclear in the manufactured battery 100. Therefore, the angle of the inner surface of the metal layer 20*a* of the outer body 20 may be regarded as θ5. Specifically, as shown in FIG. 13A, the angle of the inner surface of the metal layer 20*a* (shown only in the upper outer body 20) of the outer body 20, namely the angle between the inner surface of the metal layer 20*a* in the flat outer body portion 21 corresponding to the flat first region portion 41*a* and a straight line extended from the inner surface of the metal layer 20*a* in the tilted outer body portion 22 corresponding to the tilted first region portion 42*a*, may be regarded as θ5.

When θy of the heat bar 60 satisfies θ1=θy>θ2 in the sealing step S3, θ3 and θ4 of the battery 100 may satisfy θ3=θ4. Even in such a case, θ5 and θ6 satisfy θ5>θ6.

As described above, the battery 100 manufactured by the sealing step S3 has a predetermined structural feature in terms of the angle of the resin layer 40.

For example, θ3 may be 30° or more, and may be 60° or less. θ4 and θ5 may be 10° or more, or 20° or more, and may be 40° or less, or 30° or less. θ6 may be 10° or more, and may be 40° or less. The difference between θ3 and θ4 may be 10° or more, or 15° or more, and may be 30° or less, or 25° or less. The difference between θ5 and θ6 may be 10° or more, or 15° or more, and may be 30° or less, or 25° or less.

In summary, when θy of the heat bar 60 satisfies θ1>θy>θ2, the power generation element 10 can be sealed inside the outer body 20 in the sealing step S3 so that θ3 and θ4 satisfy θ3>θ4. On the other hand, when θy of the heat bar 60 satisfies θ1=θy>θ2, the power generation element 10 can be sealed inside the outer body 20 in the sealing step S3 so that θ5 and θ6 satisfy θ5>θ6. Other conditions of the heat bar 60 need to be set as appropriate.

The method for manufacturing a battery according to the present disclosure is described above based on one embodiment. In the method for manufacturing a battery according to the present disclosure, a gap is less likely to form between the current collector terminal and the outer body.

Battery Intermediate

The present disclosure provides a battery intermediate including: a power generation element; a current collector terminal electrically connected to the power generation element; and a resin layer located along at least one surface in a thickness direction of the current collector terminal. The current collector terminal includes a flat terminal portion with a constant thickness, and a tilted terminal portion connected to the flat terminal portion and thinned toward outside in a lateral direction. The tilted terminal portion is provided in at least one end portion of the current collector terminal. The resin layer includes a flat resin layer portion located along a surface of the flat terminal portion, and a tilted resin layer portion connected to the flat resin layer portion and located along a surface of the tilted terminal portion. θ1 and θ2 satisfy θ1>θ2, where θ1 is an angle between the flat terminal portion and a straight line extended from the tilted terminal portion, and θ2 is an angle between the flat resin layer portion and a straight line extended from the tilted resin layer portion.

The battery intermediate of the present disclosure can be manufactured by the placing step in the method for manufacturing a battery according to the present disclosure. According to the battery intermediate of the present disclosure, gap formation between the current collector terminal and the outer body can be reduced when sealing the battery intermediate inside the outer body, and poor heat welding can be reduced. Detailed description of the battery intermediate of the present disclosure will be omitted as it is given above.

Battery

The present disclosure provides a battery including: a power generation element; an outer body housing the power generation element; a current collector terminal electrically connected to the power generation element and located so as to extend to outside from the outer body; and a resin layer located along at least one surface in a thickness direction of the current collector terminal and located between the current collector terminal and the outer body. The resin layer and the outer body are heat welded together. The current collector terminal includes a flat terminal portion with a constant thickness, and a tilted terminal portion connected to the flat terminal portion and thinned toward outside in a lateral direction. The tilted terminal portion is provided in at least one end portion of the current collector terminal. The resin layer includes a flat resin layer portion located along a surface of the flat terminal portion, and a tilted resin layer portion connected to the flat resin layer portion and located along a surface of the tilted terminal portion. θ3 and θ4 satisfy θ3>θ4, where θ3 is an angle between the flat terminal portion and a straight line extended from the tilted terminal portion, and θ4 is an angle between the flat resin layer portion and a straight line extended from the tilted resin layer portion.

The present disclosure provides a battery including: a power generation element; an outer body housing the power generation element; a current collector terminal electrically connected to the power generation element and located so as to extend to outside from the outer body; and a resin layer located along at least one surface in a thickness direction of the current collector terminal and located between the current collector terminal and the outer body. The resin layer is heat welded to the outer body. The current collector terminal includes a flat terminal portion with a constant thickness, and a tilted terminal portion connected to the flat terminal portion and thinned toward outside in a lateral direction. The tilted terminal portion is provided in at least one end portion of the current collector terminal. The resin layer includes, in a longitudinal direction, a first region welded to the outer body and a second region not welded to the outer body. The first region of the resin layer includes a flat first region portion located along a surface of the flat terminal portion, and a tilted first region portion connected to the flat first region portion and located along a surface of the tilted terminal portion. The second region of the resin layer includes a flat second region portion located along the surface of the flat terminal portion, and a tilted second region portion connected to the flat second region portion and located along the surface of the tilted terminal portion. θ5 and θ6 satisfy θ5>θ6, where θ5 is an angle between the flat first region portion and a straight line extended from the tilted first region portion, and θ6 is an angle between the flat second region portion and a straight line extended from the tilted second region portion.

The battery of the present disclosure can be manufactured by the method for manufacturing a battery according to the present disclosure. According to the battery of the present disclosure, gap formation between the current collector terminal and the outer body is reduced, and poor heat welding is reduced. Detailed description of the battery of the present disclosure will be omitted as it is given above.

What is claimed is:

1. A battery comprising:
a power generation element;
an outer body housing the power generation element;
a current collector terminal electrically connected to the power generation element and located so as to extend to outside from the outer body; and
a resin layer located along at least one surface in a thickness direction of the current collector terminal and located between the current collector terminal and the outer body, the at least one surface being a surface of the current collector terminal, wherein:
the resin layer and the outer body are heat welded together,
the current collector terminal includes a flat terminal portion with a constant thickness, and a tilted terminal portion connected to the flat terminal portion and thinned toward an outside in a lateral direction of the current collector terminal, wherein the tilted terminal portion is tapered in a cross-sectional view in the lateral direction of the current collector terminal,
the tilted terminal portion is provided in at least one end portion of the current collector terminal in the lateral direction of the current collector terminal,
the resin layer includes a flat resin layer portion located along a surface of the flat terminal portion, and a tilted resin layer portion connected to the flat resin layer portion and located along a surface of the tilted terminal portion, wherein a thickness of the tilted resin layer portion increases on the surface of the tilted terminal portion as it gets closer to the outside in the lateral direction of the current collector terminal, and
$\theta 3$ and $\theta 4$ satisfy $\theta 3 > \theta 4$,
where $\theta 3$ is an angle between the flat terminal portion and a straight line extended from the tilted terminal portion, and $\theta 4$ is an angle between the flat resin layer portion and a straight line extended from the tilted resin layer portion.

2. The battery according to claim 1, wherein:
the resin layer includes, in a longitudinal direction of the resin layer, a first region welded to the outer body and a second region not welded to the outer body,
the first region of the resin layer includes a flat first region portion located along the surface of the flat terminal portion, and a tilted first region portion connected to the flat first region portion and located along the surface of the tilted terminal portion,
the second region of the resin layer includes a flat second region portion located along the surface of the flat terminal portion, and a tilted second region portion connected to the flat second region portion and located along the surface of the tilted terminal portion, and
$\theta 5$ and $\theta 6$ satisfy $\theta 5 > \theta 6$, where $\theta 5$ is an angle between the flat first region portion and a straight line extended from the tilted first region portion, and $\theta 6$ is an angle between the flat second region portion and a straight line extended from the tilted second region portion.

3. A battery intermediate comprising:
a power generation element;
a current collector terminal electrically connected to the power generation element; and
a resin layer located along at least one surface in a thickness direction of the current collector terminal, the at least one surface being a surface of the current collector terminal, wherein:
the current collector terminal includes a flat terminal portion with a constant thickness, and a tilted terminal portion connected to the flat terminal portion and thinned toward an outside in a lateral direction of the current collector terminal, wherein the tilted terminal portion is tapered in a cross-sectional view in the lateral direction of the current collector terminal,
the tilted terminal portion is provided in at least one end portion of the current collector terminal in the lateral direction of the current collector terminal,
the resin layer includes a flat resin layer portion located along a surface of the flat terminal portion, and a tilted resin layer portion connected to the flat resin layer portion and located along a surface of the tilted terminal portion, wherein a thickness of the tilted resin layer portion increases on the surface of the tilted terminal portion as it gets closer to the outside in the lateral direction of the current collector terminal, and
$\theta 1$ and $\theta 2$ satisfy $\theta 1 > \theta 2$,
where $\theta 1$ is an angle between the flat terminal portion and a straight line extended from the tilted terminal portion, and $\theta 2$ is an angle between the flat resin layer portion and a straight line extended from the tilted resin layer portion.

4. The battery of claim 1, wherein a length in a lateral direction of the flat terminal portion is 20%-90% of a length in the lateral direction of the current collector terminal; and
a length in the lateral direction of the tilted terminal portion is 10%-80% of the length in the lateral direction of the current collector terminal.

5. The battery of claim 1, wherein the resin layer includes a heat welding layer and a protective layer.

6. The battery of claim 1, wherein $\theta 3$ is 30°-60°.

7. The battery intermediate of claim 3, wherein a length in a lateral direction of the flat terminal portion is 20%-90% of a length in the lateral direction of the current collector terminal; and
a length in the lateral direction of the tilted terminal portion is 10%-80% of the length in the lateral direction of the current collector terminal.

8. The battery intermediate of claim 3, wherein the resin layer includes a heat welding layer and a protective layer.

9. The battery intermediate of claim 3, wherein $\theta 1$ is 30°-60°.

* * * * *